(Model.)
G. W. BROWN.
CORN PLANTER CHECK ROWER.
No. 258,216.  Patented May 23, 1882.
2 Sheets—Sheet 2.
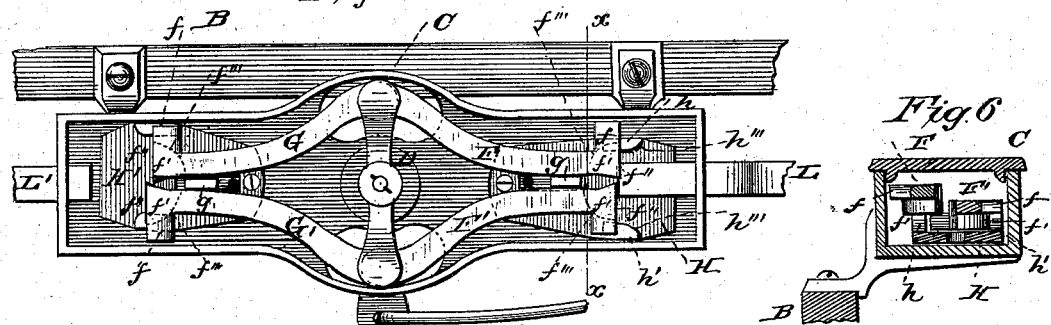
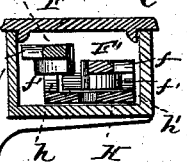
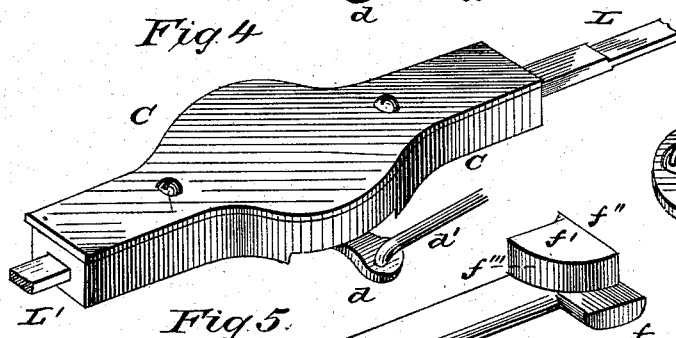
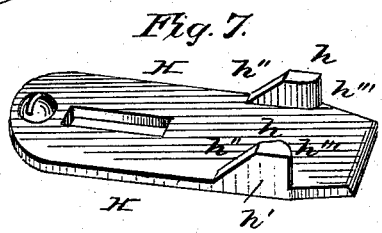
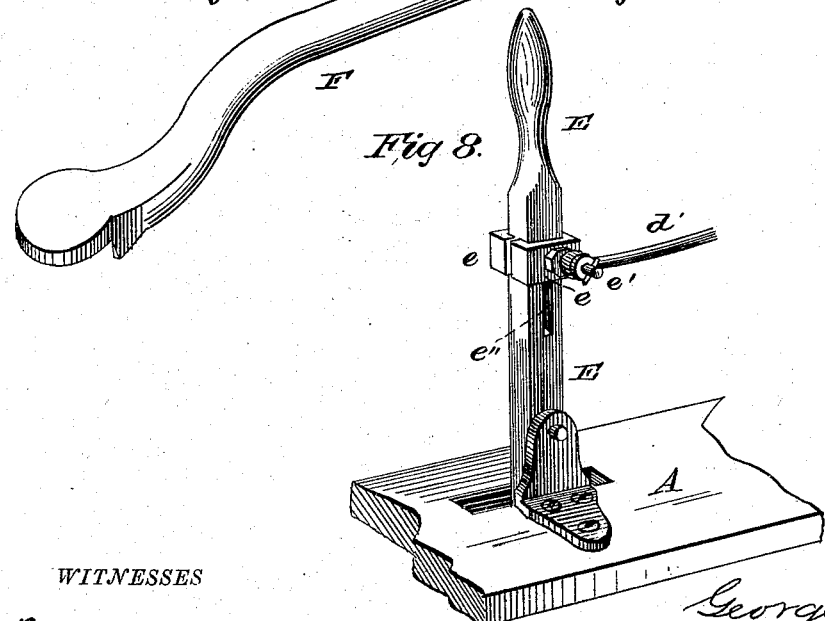
WITNESSES
INVENTOR
George W. Brown
By W. B. Richards
Attorneys

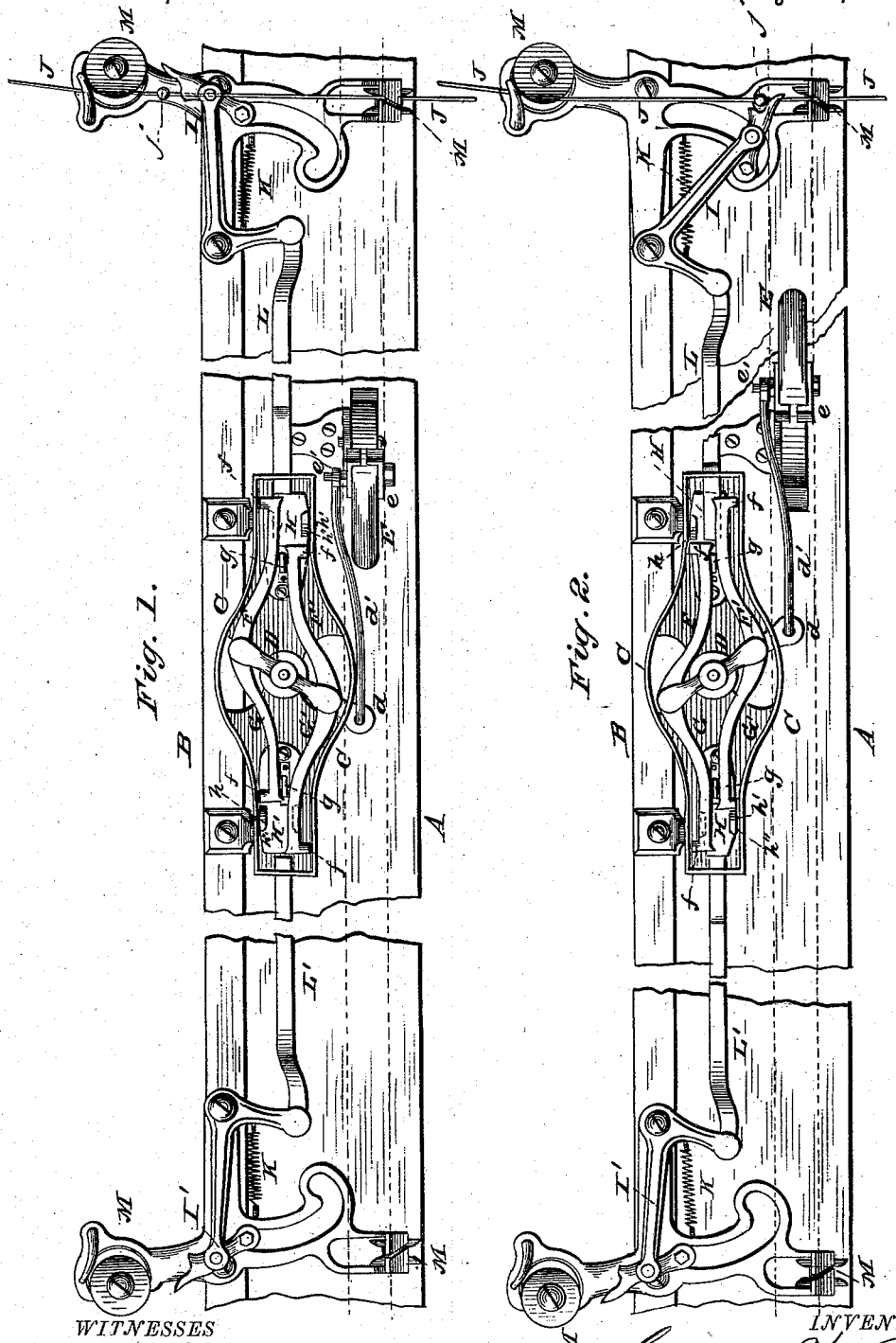

UNITED STATES PATENT OFFICE.

GEORGE W. BROWN, OF GALESBURG, ILLINOIS.

CORN-PLANTER CHECK-ROWER.

SPECIFICATION forming part of Letters Patent No. 258,216, dated May 23, 1882.

Application filed January 21, 1882. (Model.)

*To all whom it may concern:*

Be it known that I, GEORGE W. BROWN, a citizen of the United States, residing at Galesburg, in the county of Knox and State of Illinois, have invented certain new and useful Improvements in Corn-Planter Check-Rowers, of which the following is a specification, reference being had therein to the accompanying drawings.

This invention relates to check-row attachments to corn-planters of the class in which a stretched wire or cord with tappets or knots is used to actuate the check-row devices; and the invention consists in constructions and combinations hereinafter described and claimed.

In the accompanying drawings, which illustrate my invention, Figure 1 is a top plan, partly broken away to show the working parts. Fig. 2 is also a top plan, showing the working parts in different relative positions from those shown at Fig. 1. Fig. 3 is an enlarged top plan, showing the working parts in different relative positions from those shown at Figs. 1 and 2. Fig. 4 is a perspective of the casing containing the central working parts. Fig. 5 is an enlarged perspective of one of the hinged arms, shown bottom side up. Fig. 6 is a sectional elevation in the line $x$ $x$ in Fig. 3. Fig. 7 is an enlarged perspective of the oscillating plate H. Fig. 8 is a perspective of the lever for actuating the seed-slides.

Referring to the drawings by letters, the same letter indicating the same part in the different figures, letter A represents an ordinary transverse bar of a corn-planter, and B a bar to which the check-row devices are secured. The bar B is secured transversely on the planter, either to the bar A or to any other suitable part of the planter.

C is a case attached to the bar B at or near its mid-length portion. The case C is shown at Figs. 1, 2, and 3 with its cap or cover removed. D is a bar pivoted at its mid-length portion to the bottom of the case C, and one of its ends $d$ extended outward through an opening in the bottom of the case and connected by a rod, $d'$, with the lever E, which is the ordinary oscillating lever for operating the seed-slides of the planter. Clamps $e$ are located one on each side of the lever E, and are held thereto by a bolt, $e'$, which passes through the clamps and through a slot, $e''$, in the lever. The end of the rod $d'$ is hinged or journaled to the bolt $e'$, and the clamps $e$ may be adjusted lengthwise on the lever E, and may be held after adjustment by the bolt $e'$. By adjusting the bolt $e'$ and rod $d'$ on the lever E as described the oscillations of the bar D may be made to impart greater or lesser movements to the seed-slides, as desired.

Arms F F' are hinged one to each end of the arm D, and project from it on one side, and similar arms, G G', are similarly hinged to it and project from its opposite side. Each arm F F' G G' has a lug, $f$, projecting laterally and outwardly from its distal end. The arms F F' are bent so that their distal ends are near to each other, and said distal ends are made to move in direct and coincident paths, when moved by the oscillations of the bar D, by reason of their lugs $f$ sliding in contact with the walls of the case C and their adjacent sides against a stud, $g$, which projects upwardly from the bottom of the case C between the arms F F'. The arms G G' are bent similarly to the arms F F', and their distal ends made to slide in direct paths in same manner as the arms F F'. Each arm F F' and G G' has a cam-lug, $f'$, projecting downwardly from its free or distal end. Each cam-lug $f'$ has a vertical face or outer side, $f''$, and a cam-face or beveled face, $f'''$, on its side toward the bar D. The cam-lugs $f'$ are formed as shown by full lines at Fig. 5 and dotted lines at other figures.

A plate, H, located beneath the free ends of the arms F F', is hinged or pivoted at its end toward the bar D to the bottom of the case C, so that its outer end may swing in a horizontal plane transversely to the arms F F', and a similar swinging plate, H', is located beneath the arms G G'. A cam-lug, $h$, projects upwardly from one side of and near the free end of the plate H, and a similar cam-lug, $h'$, projects upwardly from its other side. The lugs $h$ $h'$ are beveled or have inclined upper sides, $h''$, at their ends toward the bar D, and have their faces toward each other, $h'''$, beveled at their other ends. (See Fig. 7.) The plate H' has cam-lugs $h$ $h'$, same as the plate H.

I I' are the forked levers, which are acted on by the tappets $j$ on the ordinary tappet-wire, J, which wire is stretched over the ground to be planted. The forked levers I I' are elbow-shaped, and have their outer ends hinged to their main portions and their hinged outer ends guided and swung by a curved slot, same as the forked levers shown and described in Letters Patent No. 248,285, granted to me October 18, 1881, and need not be described here further than that in the present case but one forked lever is used at each end of the bar B, instead of two, as in said patent, and that in this case the forked lever is moved or given a throw in one direction by the tappets on the wire, and is moved in the opposite direction by a spring, K. A push-bar, L, extends from the forked lever I into the adjacent end of the case C, and a similar push-bar, L', extends from the lever I' into the other end of said case. Ordinary guide-pulleys, M, retain the tappet-wire in proper working relation to the forked levers I I'.

In operation the planter is moved along the tappet-wire and the tappets force the forked ends of the forked levers backward in the ordinary manner. Each movement or throw of the forked lever, as last described, thrusts the end of the push-bar connected therewith forward and into the case C, and each movement of the forked lever in the opposite direction, as effected by the spring, retracts the push-bar. Supposing the parts to be in the relative positions shown at Fig. 1, the arms F F' in the same horizontal plane, and the plate H swung over to the side next the arm F', then as the push-bar L is thrust forward its end will strike the outer end of the arm F and force it forward, and thereby give a throw to the bar D, lever E, and the planter seed-slides. As the push-bar moves forward, as last described, the beveled side $f''''$ of the cam-lug $f'$ will come in contact with the beveled side $h''''$ of the cam-lug $h$ and swing the plate H over to the opposite side of the case C, or side next the arm F, as shown at Fig. 2. When the arm F is thrust forward, as last described, the arm F' will be thrust backward by the bar D into the position shown at Fig. 2. As the arm F' moves backward, as last described, its end will slide up the inclined side $h''$ of the lug $h'$ and be thereby elevated, so as not to interfere with the forward movement of the push-bar L, which slides forward beneath it. When the push-bar L is retracted (by the spring giving a throw to the forked lever) and again brought into the position shown at Fig. 1, it (the push-bar) will be drawn from beneath the arm F' and permit said arm to fall with its cam-lug $f'$ behind the cam-lug $h'$ of the plate H. The next forward movement of the push-bar L will act on the arm F', and its cam-lug $f'$ will vibrate the plate H by striking the cam-lug $h'$ on said plate, and the arm F will slide backward and be raised by the lug $h$ for the passage of the push-bar in substantially same manner as hereinbefore described in connection with the forward movement of the arm F.

It will be seen that while the bar D and seed-slides of the planter are being operated by the push-bar L the push-bar L' and forked lever I' are remaining still, not being worn nor requiring any force in moving them. When the planter is turned and the tappet-wire made to act on the forked lever I' the push-bar L' will then act on the adjacent arms hinged to the head D in same manner as hereinbefore described in relation to the push-bar L, and while the push-bar L' is operating the bar D and the seed-slides the bar L and forked lever I will remain stationary. The normal positions of the push-bars L L', as shown at Fig. 1, are such that the planter seed-slides may be operated by the lever E without moving either push-bar L L' or the forked levers connected therewith.

Other means than the bent levers I I' may be used to impart movement to the push-bars L L', and hence I do not limit my claims to said means; and the bar D may be otherwise connected with the seed-slides than by a connection with the lever E, and hence I do not limit my claims for combinations including the oscillating bar D and means of transmitting motion therefrom to the seed-slides to the special means shown of a rod, $d'$, and lever E.

What I claim as new is—

1. In combination with the push-bar L and head D, having arms F F' hinged thereto, a swinging plate located beneath the arms F F' and provided with cam-lugs adapted to lift said arms F F' alternately, and thereby permit the push-bar to slide beneath the lifted arm, substantially as and for the purpose specified.

2. In combination with the head D, having arms F F' hinged thereto, with cam-lugs $f'$ on the ends of said arms, the plate H, having lugs adapted to coact with said lugs $f'$, whereby a swinging movement is transmitted to the plate H from a reciprocating movement of the arms F F', substantially as and for the purpose specified.

3. The swinging plate H, having cam-lugs $h\ h'$, constructed substantially as described, in combination with the head D, having arms F F' hinged thereto, and provided with cam-lugs $f'$, substantially as and for the purpose specified.

4. In combination with the head D, with arms F F' hinged thereto, and swinging plate H, guides formed of the sides of the case C and the standard $g$, which cause the free ends of the arms F F' to move in straight and coincident paths, substantially as and for the purpose specified.

5. In combination with the push-bar L and head D, having arms F F' hinged thereto, which arms have lugs $f'$, constructed substantially as described, the swinging plate H, having lugs $h\ h'$, adapted to coact with the arms F F' and lugs $f'$, substantially as and for the purpose specified.

6. In combination with the swinging head D and arms F F', hinged thereto, the forked lever and push-bar L, adapted to impart movement to the arms F F' and head D, substantially as and for the purpose specified.

7. In a corn-planter check-rower, in combination with an oscillating bar, D, adapted to impart movement to the seed-slides, and having arms F F' hinged thereto, a push-bar, L, adapted to be actuated by a tappet-wire through the instrumentality of a forked lever, substantially as and for the purpose specified.

8. In a corn-planter check-rower, the combination of a head, D, connected with the planter seed-slides by suitable mechanism, and having arms F F' hinged thereto, swinging plate H, push-bar L, and bent lever I, adapted to be moved in one direction by the tappet-wire and in the opposite direction by a spring, substantially as and for the purpose specified.

9. In combination with the push-bars L L', forked levers I I', and tappet-wire for actuating them, devices for receiving motion from the push-bars and imparting movement to the planter seed-slides, and adapted to receive motion from one push-bar without imparting movement to the other, substantially as and for the purpose specified.

10. The head D, with arms F F' hinged to and projecting from one of its sides and arms G G' hinged to and projecting from its other side, in combination with push-bars, one of which is adapted to remain stationary while the other acts upon two of the hinged arms alternately, substantially as and for the purpose specified.

11. In combination with the head D, having a pair of arms projecting from each of its opposite sides, push-bars L L', and forked levers, springs adapted to retract the push-bars L L', whereby one push-bar may act on the devices for transmitting motion to the planter seed-slides while the other push-bar remains stationary, substantially as and for the purpose specified.

12. In combination with the push-bars, forked levers, and retracting-springs, the bar D, with a pair of arms projecting from each of its opposite sides, and lever E, connected to the bar D, whereby the planter seed-slides may be operated by the lever E without moving the push-bars or forked levers, substantially as and for the purpose specified.

In testimony whereof I affix my signature in presence of two witnesses.

GEORGE W. BROWN.

Witnesses:
R. C. HUNT,
LOREN STEVENS.